United States Patent Office 3,461,027
Patented Aug. 12, 1969

3,461,027
BONDING OF THERMOPLASTIC POLYMER RESINS TO SILANE-PRIMED SILICEOUS OR METALLIC MATERIALS
Edwin P. Plueddemann, Midland, Mich., assignor to Dow Corning Corporation, Midland, Mich., a corporation of Michigan
No Drawing. Filed Feb. 1, 1966, Ser. No. 523,901
Int. Cl. B32b 17/10, 15/08; C09j 5/02
U.S. Cl. 161—193                  10 Claims

ABSTRACT OF THE DISCLOSURE

Solid materials, such as glass fibers or metal panels are coated with silanes of the formula

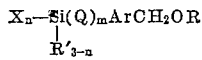

and partial condensates thereof, in which
R is a lower alkyl radical,
Ar is selected from the group consisting of divalent aryl radicals and divalent aryl ether radicals,
Q is a divalent alkyl radical,
$m$ has a value of 0 or 1,
X is the hydroxyl radical or a hydrolyzable group,
R' is a monovalent hydrocarbon radical of no more than 12 carbon atoms, and
$n$ has a value of 1 to 3;
to improve the bonding between the solid material and an organic thermoplastic polymer, such as polystyrene.

---

This application relates to compositions of matter which are superior primers for the adhesion of siliceous materials and metals to thermoplastc resins.

A number of known silicone primers for improving the adhesion of siliceous materials to thermoplastics are available, but many of them decompose at temperatures in the vicinity of 600° F., resulting in degradation of the bonding upon such heating. Furthermore, many of the known primers tend to cause discoloring of the thermoplastic at high temperatures.

It is, however, desirable for such a primer to be stable at temperatures of 600° F. and above, as the best glass reinforced thermoplastic composites are prepared by molding at such temperatures in order to maximize the flow and wetting of the glass by the thermoplastic resin.

The compositions of this invention make excellent primers for siliceous and other materials, yet they are generally stable at temperatures of about 600° F. Also, they usually do not discolor the thermoplastic which they contact.

This application relates to the process of (1) applying to (a) a material selected from the group consisting of solid siliceous materials, solid metals, and solid metal oxides, a compound selected from the group consisting of the silanes of the formula

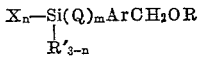

and partial condensates thereof, where R is a lower alkyl radical, Ar is selected from the group consisting of divalent aryl radicals and divalent aryl ether radicals, Q is a divalent alkyl radical, $m$ has a value of 0 to 1, X is the hydroxyl or a hydrolyzable group, R' is a monovalent hydrocarbon radical of no more than 12 carbon atoms, and $n$ has a value of from 1 to 3; (2) contacting (a) with a molten organic thermoplastic polymer having a softening temperature of below 500° F.; and (3) cooling the composite product, whereby improved and stable bonding between said siliceous or metal material and said organic material results.

The term "partial condensates" is meant to imply that a detectable amount of hydroxyl or hydrolyzable groups remain uncondensed in the compositions used herein, preferably at least one such group for every four silicon atoms.

R can be any lower alkyl radical such as methyl, ethyl, isopropyl, or butyl.

Ar is any divalent aryl radical such as phenylene, biphenylene,

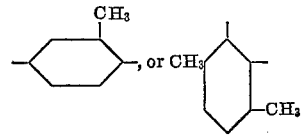

or any divalent aryl ether radical such as

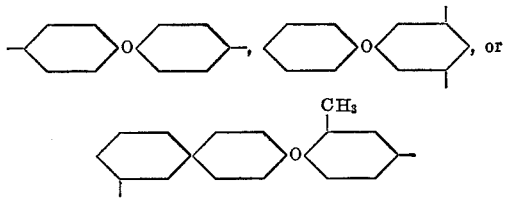

where both free valences are attached to aryl radicals.

Q can be any divalent alkyl radical such as dimethylene, trimethylene, octadecamethylene, $C_4H_9CHCH_2$—,

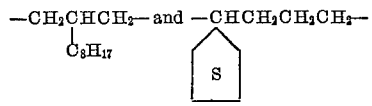

X can be the hydroxyl group or any hydrolyzable group, e.g., alkoxide groups such as methoxide, ethoxide propoxide, isohexoxide, and cyclohexoxide; halogen groups such as chloride, bromide, and fluoride; acyloxy groups such as acetate, propionate, and butyrate; ketoxime groups such as

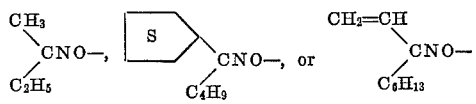

the amino group, and the isocyanate group.

R' is any monovalent hydrocarbon radical of no more than 12 carbon atoms, e.g., methyl, isobutyl, 2-ethylhexyl dodecyl, cyclohexyl, vinyl, allyl, phenyl, xenyl, 2-phenyl propyl, and tolyl.

Any organic, thermoplastic polymer having the above described characteristics is suitable herein, e.g. vinyli polymers such as polystyrene, poly(styrene-acrylonitrile) poly(acrylonitrile-butadiene-styrene), poly(styrene-methylmethacrylate), polymethylmethacrylate, polyethylene polypropylene, polyvinyl chloride and polyvinyliden chloride; polyesters such as poly(ethylene glycol tereph thalate) and poly(resorcinol succinate); polyamides sucl as poly(ethylene diamine adipate), poly(benzidene fumarate), and poly(3-aminopropionic acid); and polycarbonate resins such as

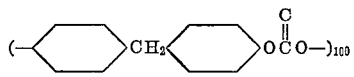

The term "thermoplastic" is meant to imply that the polymer used herein has a softening temperature which is above room temperature, i.e. 25° C.

The softening temperature of the polymer is the temperature at which the polymer becomes a liquid with a viscosity of one million cs., i.e. it becomes readily deformable to any shape.

The term "molten" implies that the thermoplastic resin is at a temperature above that of its softening point.

Any solid siliceous material can be used in this application e.g., glass or fiber; powdered glass, quartz, rock, or clay; sheets of glass, quartz, or rock; or silicone elastomers or resins. Glass cloth and fibers are preferred. Metals which can be used are aluminum sheeting, copper wire, silver wire, steel rods, iron filings, and nickel powder. Examples of metal oxides are powdered alumina, iron oxide, and titanium dioxide.

The primers of this invention can be applied to the siliceous material, metal, or metal oxide by any means, but it is preferred to apply them in a diluted form. The diluting agent can be any volatile solvent such as hexane, octane, toluene, isopropanol, dibutylether, ethyleneglycol dimethylether, acetone, trichloroethane, or trichlorotrifluoroethane. Water is an excellent diluting agent when a partial condensate is to be used as the primer.

The primer can be applied by dipping, brushing, spraying, etc.

The thermoplastic polymer and ingredient (a) can be brought together in any manner; e.g. the chopped or ground, treated ingredient (a) material can be stirred or milled into the molten polymer to make a molding compound of superior strength; sheets of the thermoplastic polymer can be pressed into sheets of glass cloth at a high temperature to form laminates, and molten thermoplastic polymer can be extruded in a film onto a siliceous sheet such as a pane of glass, or onto a cable which is covered with silicone rubber, etc.

The term "cooling the composite product" is meant to describe the cooling of the product to a temperature below the softening point of the thermoplastic used.

A preferred thermoplastic polymer is one which contains aromatic units (e.g. polymers and copolymers containing styrene), while the preferred embodiment of this process is in the production of chopped glass fiber reinforced composites.

The compositions of this invention can be made by reacting a silane of the formula

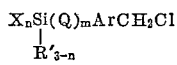

with RONa in a solvent such as methanol, where the symbols are as defined above. The above starting materials can be made by ordinary organic syntheses which are obvious to the skilled chemist.

The compositions of this invention can also be made by preparing a Grignard reagent from ROCH$_2$Ar(Q)$_m$Br and then reacting that with a silane of the formula

where the symbols are defined above.

A third method of preparation is to react ROCH$_2$ArQ' with

in the presence of chloroplatinic acid, where Q' is a monovalent aliphatic hydrocarbon which contains one unsaturated group, e.g. a vinyl or allyl radical.

Examples of the silanes which are within the scope of this invention are

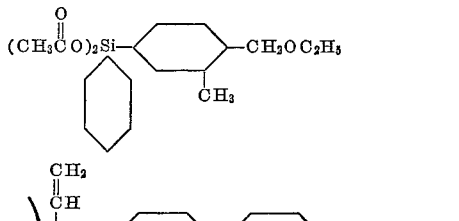

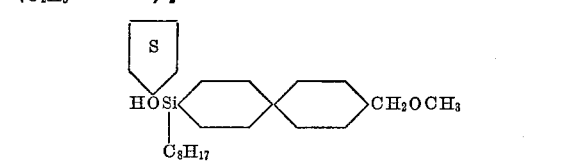

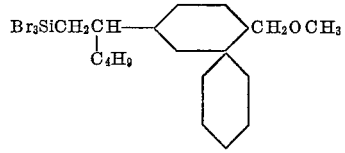

and

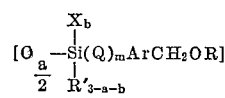

The condensates of the silanes of this invention generally form spontaneously upon exposure of the silanes to moisture by the well-known mechanisms of condensation of hydrolyzable silanes. During the condensation process, siloxane bonds are formed between silicon atoms, replacing the hydroxyl and hydrolyzable groups.

The condensation products can be polymers of the average unit formula $$[O_{\frac{a}{2}} - \underset{R'_{3-a-b}}{\overset{X_b}{Si}}(Q)_m ArCH_2 OR]$$

where $a$ has an average value of 1 to 3, and $b$ has an average value of 0 to 2, the sum of $a$ and $b$ being from 1 to 3, and the other symbols are defined above.

Examples of these condensation products are:

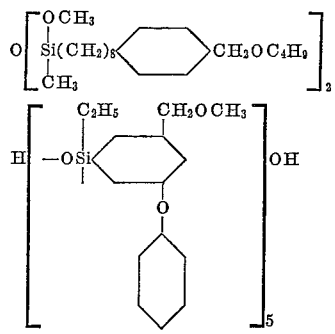

and

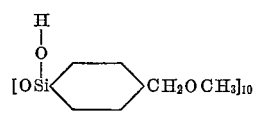

It is preferred for X to be chloride or methoxy, for $n$ to be 3, for $m$ to be 1, for Q to be dimethylene, for Ar to be phenylene, and for R to be methyl. Excellent primers can be prepared from the silanes of this invention having the above characteristics.

The following examples are illustrative only and should not be construed as limiting the invention, which is properly delineated in the appended claims.

Example 1

To 169.7 g. of mixed isomers (ortho, meta, and para) of

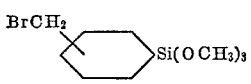

there was added 35 g. of sodium methoxide in 600 ml. of methanol. The mixture was refluxed for one hour. The methanol was then removed by stripping, and the residue was filtered to remove the sodium bromide by-product to recover 80 g. of crude product.

Distillation on a spinning band column produced a fraction which was a mixture of isomers of the structure

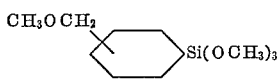

B.P. 91° C. (0.45 mm.), $n_D^{25}$ 1.4788, $d_4^{25}$ 1.081.

Several squares of No. 181 heat-cleaned glass cloth were dipped in a 0.5 weight percent ethanol solution of the above silane and allowed to dry. The cloth squares were then pressed with polystyrene to form 14 ply laminates having a thickness of about 0.14 in.

Equivalent laminates were prepared from glass cloth which had not been treated with the silane solution. The tensile and compressive strengths of the laminates were compared, both before and after immersing them for 2 hours in boiling water.

| | Laminates pressed at 575° F. | | | |
|---|---|---|---|---|
| | Flexural strength (p.s.i.) | | Compressive strength (p.s.i.) | |
| Silane coupling agent | Dry | After boil | Dry | After boil |
| None | 31,400 | 19,800 | 16,100 | 8,200 |
| The above silane | 46,900 | 44,500 | 23,900 | 25,200 |

| | Laminates pressed at 625° F. | | | |
|---|---|---|---|---|
| | Flexural strength (p.s.i.) | | Compressive strength (p.s.i.) | |
| Silane coupling agent | Dry | After boil | Dry | After boil |
| None | 35,000 | 21,000 | 11,600 | 7,700 |
| The above silane | 58,600 | 57,600 | 27,500 | 21,900 |

None of the silane-treated laminates showed discoloration after they were cooled.

Example 2

(a) A flask was charged with 100 ml. of tetrahydrofuran and 4.8 g. of magnesium turnings. The flask was flushed with $N_2$, and 40 g. of

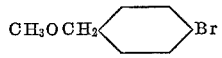

was slowly added with stirring while the mixture was heated to reflux in the presence of a few iodine crystals as a reaction initiator. A rapid exothermic reaction took place, the

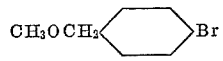

being added at such a rate as to maintain the reaction temperature at about 70° C.

After the addition was complete, reflux was continued for 2 hours.

In another flask there was placed 60 g. of methyltrichlorosilane. To this there was slowly added the filtered, cooled product of the above reaction. After the addition, the mixture was refluxed for two hours. The mixture was cooled, filtered, and distilled to recover 16.2 g. of a product of the formula

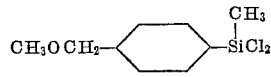

B.P. 70–80° C. at 1.5 mm. of Hg pressure; neutral equivalent, 123.5.

When the product of experiment (a) is applied to chopped glass fibers, composites made from the glass and a resinous copolymer of ethylene glycol and adipic acid having a softening temperature of 290° F. possess improved flexual and compressive strength and improved hydrolytic stability over composites made from untreated glass fibers.

Example 3

To 30 g. of m-methoxymethylstyrene there was added 5 drops of an isopropanol solution containing 1 weight percent of platinum in the form of chloroplatinic acid, and a trace of butylamine. This was heated to about 100° C., and 27 g. of trichlorosilane were added while maintaining the temperature at 100° to 120° C.

The mixture was then heated for one hour at 120° C., and then distilled.

Twenty eight grams of

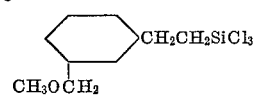

were recovered, B.P. 100° C. at 0.35 mm. pressure; $n_D^{26}$ 1.5162; density at 25° C. 1.23.

Several squares of No. 181 heat-cleaned glass cloth were dipped in a 0.5 weight percent toluene solution of the above silane and air-dried. The glass cloth was then dipped in water and dried for 7 minutes at 230° F.

The cloth squares were pressed with polystyrene to form 14 ply laminates having a thickness of 0.142 in. The molding temperature was 572° F.

The tensile and compressive strengths of the laminates were measured as in Example 1:

Flexural strength (p.s.i.):
  Dry _____ 66,300
  After boil _____ 62,200
Compressive strength (p.s.i.):
  Dry _____ 31,200
  After boil _____ 22,600

Example 4

A silane of the formula

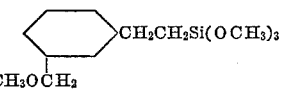

was prepared from

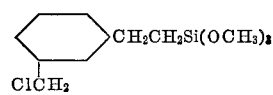

and sodium methoxide by refluxing in methanol for 4 hours. The reaction mixture was filtered to remove NaCl, and distilled to recover the product boiling at 122°–124° C. at 1 mm.; $n_D^{26}$ 1.4830; density at 25° C.–1.052.

Laminates similar to those of Example 3 were prepared from glass cloth which had been dipped in a 0.5 weight percent ethanol solution of

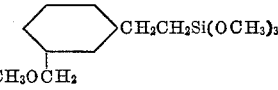

The laminates had a thickness of 0.145 in.
  Their physical properties were:

Flexural strength (p.s.i.):
  Dry _____ 65,000
  After 2 hr. boil _____ 61,300
Compressive strength (p.s.i.):
  Dry _____ 27,100
  After 2 hr. boil _____ 27,800

Example 5

When the following Grignard reagents are reacted with the following silanes, the following products are formed:

| Grignard Reagent | Silane | Product |
|---|---|---|
| (a) C₂H₅OCH₂⟨⟩O⟨⟩CH₂MgCl | ClSi(OC₃H₇)₂ 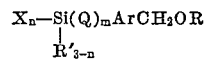 | C₂H₅OCH₂⟨⟩O⟨⟩CH₂Si(OC₃H₇)₂ |
| (b) CH₃OCH₂⟨⟩MgCl with CH₃ 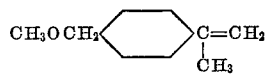 | C₁₀H₂₁SiCl₃ | CH₃OCH₂⟨⟩—SiCl₂ with CH₃, C₁₀H₂₁ |
| (c) CH₃O⟨⟩⟨⟩(CH₂)₄MgCl 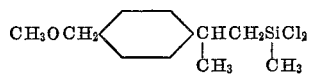 | SiCl₄ | CH₃O⟨⟩⟨⟩(CH₂)₄SiCl₃ |

These products, and their hydrolyzates, all make superior primers for the adhesion of poly(ethylenediamine adipate) to silicone rubber when they are placed on the silicone rubber in a ten percent solution of isopropanol, and the solvent is allowed to dry; and the thermoplastic is then applied to the silicone rubber at a temperature of 600° F.

Example 6

When 20 g. of

CH₃OCH₂⟨⟩C=CH₂ with CH₃ are reacted at 110° C. with 8 g. of methylhydrogendichlorosilane in the presence 0.01 g. of chloroplatinic acid, the product CH₃OCH₂⟨⟩CHCH₂SiCl₂ with CH₃, CH₃ is formed.

When powdered $TiO_2$ is treated with a 1% ethanol solution of the above silane and allowed to dry, it can be used to prepared composites with polypropylene which possess superior physical characteristics.

Example 7

Aluminum panels were primed with a 10% methanol solution of the hydrolyzed product of Example 1. Polystyrene granules were allowed to fuse on both primed and unprimed panels warmed to 400° F.

After cooling, it was observed that polystyrene had good adhesion to both primed and unprimed panels. After immersing in boiling water for 30 minutes, however, the polystyrene on the unprimed panels was loosened and could easily be removed by rubbing with the finger. After similar boiling water treatment of primed panels, the polystyrene still retained good adhesion to aluminum, and could not be removed by rubbing.

Example 8

A molten thermoplastic polymer was spread on the end edges of heated glass microscope slides, and two such ends were joined together under light pressure while cooling to produce butt joints. The glued joint was tested by leaning the composite at a 45° angle in boiling water until it broke under its own weight. The average results of this test with four duplicates of each sample were determined.

Some of the microscope slides had been primed by moistening the ends with a 10% solution in methanol of the hydrolyzed product of Example 1.

| Polymer | Primed | Average time to break |
|---|---|---|
| Poly(ethylene terephthalate) | No | 28 mins. |
| Do | Yes | 45 mins. |
| Bis-phenol-A-polycarbonate resin | No | ~3 hrs. |
| Do | Yes | ~7 hrs. |

That which is claimed is:

1. An article of manufacture comprising a solid material (a) selected from the group consisting of siliceous materials, metals and metal oxides coated with a compound (b) selected from the group consisting of silanes of the formula $$X_n—Si(Q)_mArCH_2OR$$
$$R'_{3-n}$$

and partial condensates thereof, in which
    R is a lower alkyl radical,
    Ar is selected from the group consisting of divalent aryl radicals and divalent aryl ether radicals,
    Q is a divalent alkyl radical,
    m has a value of 0 or 1,
    X is a hydroxyl group or a hydrolyzable radical,
    R' is a monovalent hydrocarbon radical of no more than 12 carbon atoms, and
    n has a value of from 1 to 3.

2. The article of claim 1 wherein the solid material (a) is fibrous glass.

3. An article of manufacture comprising the coated solid material of claim 1 bonded to the coated side to an organic thermoplastic polymer.

4. The article of claim 3 wherein the coated solid material is fibrous glass.

5. The article of claim 3 wherein the organic thermoplastic polymer contains styrene units.

6. The process comprising the steps of:
(1) applying to a solid material (a) selected from the group consisting of siliceous materials, metals and metal oxides, a compound (b) selected from the group consisting of silanes of the formula $$X_n—Si(Q)_mArCH_2OR$$
$$R'_{3-n}$$

and partial condensates thereof, in which
    R is a lower alkyl radical,
    Ar is selected from the group consisting of divalent aryl radicals and divalent aryl ether radicals,
    Q is a divalent alkyl radical,
    m has a value of 0 or 1,
    X is a hydroxyl group or a hydrolyzable radical,
    R' is a monovalent hydrocarbon radical of no more than 12 carbon atoms, and
    n has a value of from 1 to 3;
(2) contacting the treated solid material with a molten organic, thermoplastic polymer having a softening temperature of below 500° F., and
(3) cooling the composite product, whereby improved and stable bonding between the solid material and the organic polymer results.

7. The process of claim 6 wherein the siliceous material is fibrous glass.

8. The process of claim 6 wherein the organic thermoplastic polymer contains styrene units.

9. The process of claim 6 wherein X is methoxy and m is 0.

10. The process of claim 6 wherein Ar is phenylene and $m$ is 0.

References Cited

UNITED STATES PATENTS

| | | | |
|---|---|---|---|
| 2,601,337 | 6/1952 | Smith-Johannsen | 16—193 |
| 2,942,019 | 6/1960 | Pike et al. | 117—124 X |
| 2,946,701 | 7/1960 | Plueddemann | 117—124 X |
| 3,158,528 | 11/1964 | Brown | 161—193 X |
| 3,223,577 | 12/1965 | Plueddemann | 117—100 X |
| 3,318,757 | 5/1967 | Atwell | 161—193 |
| 3,360,425 | 12/1967 | Boone | 161—207 X |
| 3,376,188 | 4/1968 | Clayton et al. | 161—193 |
| 3,398,043 | 8/1968 | Youngs | 156—329 |
| 3,398,044 | 8/1968 | Plueddemann | 161—19 |
| 3,398,210 | 8/1968 | Plueddemann et al. | 161—193 |
| 3,350,345 | 10/1967 | Vanderbilt et al. | 156—329 |
| 3,379,607 | 4/1968 | Foster et al. | 156—329 |
| 3,395,069 | 7/1968 | Plueddemann | 161—19 |

HAROLD ANSHER, Primary Examiner

U.S. Cl. X.R.

161—207, 208; 117—124; 156—329; 260—448